United States Patent [19]
Achter et al.

[11] 3,961,964
[45] June 8, 1976

[54] COATING COMPOSITION FOR SUPPRESSING COMBUSTION OF TITANIUM METAL

[75] Inventors: Meyer R. Achter, Washington, D.C.; James R. Griffith, Riverdale Heights, Md.

[73] Assignee: The United States of America as represented by the Secretary of the Navy, Washington, D.C.

[22] Filed: Oct. 24, 1973

[21] Appl. No.: 406,074

[52] U.S. Cl. .............................. 106/15 FP; 252/8.1; 427/386; 427/388
[51] Int. Cl.². ........................................... C09D 5/14
[58] Field of Search ............ 427/388, 386; 252/401, 252/8.1; 106/15 FP

[56] References Cited
UNITED STATES PATENTS

| | | | |
|---|---|---|---|
| 3,689,513 | 9/1972 | Cain et al. ...................... | 252/401 X |
| 3,752,768 | 8/1973 | Thompson et al. ............. | 252/401 X |

*Primary Examiner*—Stephen J. Lechert, Jr.
*Attorney, Agent, or Firm*—R. S. Sciascia; Philip Schneider; Thomas McDonnell

[57] ABSTRACT

A coating composition containing the active ingredient N,N-diglycidyl-2,4,6-tribromoaniline which is used to suppress combustion of titanium metal.

5 Claims, No Drawings

COATING COMPOSITION FOR SUPPRESSING COMBUSTION OF TITANIUM METAL

BACKGROUND OF THE INVENTION

Titanium and a number of its alloys continue to burn if high velocity air is flowing over its surface even after the igniting agent, e.g. a laser beam, is turned off. Due to the increased use of titanium in the production of aircraft, great concern, especially among the military, has been generated in suppressing titanium metal combustion due to laser exposure.

Suppression of such combustion was previously accomplished by evaporating a metal boride onto the surface of the metal. This procedure, however, is inconvenient to carry out and would be extremely difficult to perform on a large surface, such as the wing of an aircraft.

SUMMARY OF THE INVENTION

The present invention relates to a coating composition which acts as a fire suppressant. More specifically, the coating composition containing N,N-diglycidyl-2,4,6-tribromoaniline, hereinafter referred to as Epoxy 1, mixed with a solution of cyclopentene ether-2,3,2',3' diepoxide in the diglycidyl ether of bisphenol A, hereinafter referred to as Epoxy 2, is coated on a metallic titanium surface to suppress combustion resulting when said surface is subjected to laser radiation.

It is, therefore, an object of the invention to provide a novel method by which titanium metal can be protected from combustion due to laser radiation.

Another object of the invention is to provide a coating composition which aids in the suppression of the combustion of titanium.

Yet another object is to provide a coating and a method of easily applying said coating to a titanium metal surface whereby said surface is protected from total combustion due to laser radiation.

Other objects, advantages and novel features of the invention will become apparent from the following detailed description.

DETAILED DESCRIPTION

The coating of the invention consists of three major components dissolved in a solvent. The first component, believed to be the active ingredient, is N,N-diglycidyl-2,4,-6-tribromoaniline (Epoxy 1). The next component is a solution of cyclopentene ether-2,3,2',3' diepoxide in the diglycidyl ether of bisphenol A (Epoxy 2). To these components is added a third component, a curing agent.

Since Epoxy 1 is a solid at room temperature it must be heated above its melting point to about 70°C before it is added to the Epoxy 2 solution. The coating composition resulting from the 3 components being dissolved in the solvent is applied to a metallic titanium surface. It can be either brushed or sprayed on the surface. The surface is then heated, i.e. in a furnace, to cure the composition. While the cure temperature is somewhat dependent upon the curing agent used, seldom will the cure temperature be outside the range of 25° to 100°C.

Conventional epoxy curing agents may be used. Especially useful are the polyfunctional amines, such as diethylene triamine, and the fatty polyamides.

Polyfunctional amines are typified by the aliphatic primary amines, such as, ethylamine, isopropylamine, n-butylamine, isobutylamine, 2-ethylhexylamine, monoethanolamine, monoisopropanolamine, beta alanine, amides, e.g., formamide, acetamide, propionamide, n-butyramide, stearamides, hexahydrobenzamide, and the like; aromatic primary amines, such as, aniline, paramethylbenzylamine, and the like; heterocyclic primary amines, such as N-(aminoethyl)morpholine, N-(aminopropyl)morpholine, and the like, the aliphatic polyamines, such as ethylenediamine, propylenediamines, butylenediamines, pentylenediamines, hexylenediamines, octylenediamines, nonylenediamines, decylenediamines, dimethylures, 1,3-diamino-2-propanol, 3,3'-iminobispropylamine, guanidine and the like; aromatic polyamines, such as meta-, ortho-, and para-phenylenediamines, 1,4-napthalenediamine, 1,4-anthradiamine, 3,3'-biphenyldiamine, 3,4-biphenyldiamine, 3,4-toluenediamine, meta-xylylenediamine, alpha, alpha'-bi-para-toluidine, para, para'-methylenedianiline, 1-methoxy-t-methyl-meta-phenylenediamine, para, para'-sulfonyldianiline and the like; and heterocyclic polyamines, such as piperazine, 2,5-dimethylpiperazine, melamine, 2,4-diamine-5-(aminomethyl) spirobimetadioxane, the polyalkylene polyamines, in particular, the polyethlene polyamines and polypropylene polyamines such as diethylenetriamine, triethylenetetramine, tetraethylenepentamine, dipropylenetriamine and the like.

The amount of curing agent required for best results may be determined stoichiometrically from the following equation:

$$\left(\frac{\text{Weight of Epoxy 1}}{\text{Epoxy equivalent weight of Epoxy 1}}\right) + \left(\frac{\text{Weight of Epoxy 2}}{\text{Epoxy equivalent weight of Epoxy 2}}\right) = \left(\frac{\text{Weight of Curing Agent}}{\text{Equivalent weight of curing agent}}\right)$$

It is known that the epoxy equivalent weight of N,N-diglycidyl-2,4,6-tribromoaniline (Epoxy 1) is 240 and the epoxy equivalent weight of the cyclopentene ether diepoxide solution (Epoxy 2) is 140. Thus, knowing the amount of each component and the equivalent weight of curing agent, one can easily determine the amount of curing agent required.

After the three components have been mixed they are dissolved in a solvent to achieve a coating composition that is capable of being applied to a surface either by brushing or spraying. Sufficient solvent should be added such that the resulting coating composition will flow through a FORD No. 4 viscometer in about 16 to 18 seconds. A useful solvent is a system comprised of equimolar amounts of ethylacetate, cellusolve acetate and 2-nitropropane. Another useful solvent is ethanol.

Table I illustrates five coatings produced according to the techniques described above. In coatings A–D the curing agent used was an amide-amine reaction product of a dimer acid and an aliphatic polyamine produced by General Mills under the name of Versamide 125. Epoxy 2 was a solution containing 37.5% by volume cyclopentene ether-2,3,2',3' diepoxide in the di- glycidyl ether of bisphenol A. Percentages are by weight unless otherwise stated.

Coating E utilized diethylene triamine as a curing agent as well as a small amount of a thixotropic agent used for flow control purposes known as MPA-60 produced by the Baker Castor Oil Company.

Table I

|  | A | B | C | D | E |
|---|---|---|---|---|---|
| Epoxy 1 | 34.5% | 60.6% | 14.8% | 10.5% | 73.7% |
| Epoxy 2 | 24.5% | 21.4% | 31.2% | 22.4% | 14.7% |
| Curing Agent | 41.0% | 18.0% | 54.0% | 57.1% | 8.7% |
| MPA-60 | — | — | — | — | 2.9% |

Table II illustrates the corresponding ratios by volume of Epoxy 1 to Epoxy 2 for each of the coatings A–E.

Table II

|  | A | B | C | D | E |
|---|---|---|---|---|---|
| Volume of Epoxy 1 | 1 | 2 | 1 | 1 | 3.5 |
| Volume of Epoxy 2 | 1 | 1 | 3 | 2 | 1 |

The tests illustrated by Examples I–V below were therefor representative of a range in which the mixture of Epoxy 1 to Epoxy 2 contained from 25% by volume to 77% by volume Epoxy 2.

EXAMPLE I

Coating A was sprayed on to a titanium metal surface until the coating averaged 5 ml in thickness. After curing by heating in an oven the surface was subjected to a continuous $CO_2$ laser having a power of 4827 watts and an intensity of 1219 watts/$cm^2$. The diameter of the laser beam was 2.2 × 2.3 cm. After exposing the surface to the beam for ¾ second, the rating was determined to be 2.37. The rating is defined as the length of the burn hole minus the diameter of the laser beam (2.2 cm).

A second run using the same coating produce a rating of 1.78.

EXAMPLES II–V

The experiment discussed by Example I was repeated using compositions B–E as coatings and the results are listed in Table III.

Table III

|  | B[1] | C | D | E[2] |
|---|---|---|---|---|
| Rating | 1.1 | 1.68 | 2.15 | 1.67 |

Table III-continued

|  | B[1] | C | D | E[2] |
|---|---|---|---|---|
|  |  |  |  | 0.70 |

[1]surface subjected to laser for 1 second pulse.
[2]1.67 was the rating obtained if the surface was etched with HF. 0.70 was the rating obtained if the surface was treated with a standard dichromatic treatment.

EXAMPLE VI

The test was repeated using a coating consisting of the diglycidyl ether of Bisphenol A. The coating was sprayed on a titanium metal surface. After curing and subjecting the surface to the laser for 2 seconds the rating obtained was 9.83.

EXAMPLE VII

Once again the test was repeated using an acrylic lacquer coating (FED SPEC MIL-L-81352 GSA No. 80109356609). The rating obtained when subjected to a ½ second pulse was 3.89.

Coatings similar to those of the epoxy compositions A–E but without the use of Epoxy 1 readily burned when subjected to the laser.

Thus, it can be seen that combustion of titanium metal can be significantly suppressed if the metal is treated with the coating of the invention. It furthermore appears that it is beneficial to have a high content of Epoxy 1, N,N-diglycidyl-2,4,6-tribromoaniline which is to believed to be the active ingredient in suppressing combustion.

Obviously, many modifications and variations of the present invention are possible in light of the above teachings. It is therefore to be understood that within the scope of the appended claims the invention may be practiced otherwise than as specifically described.

What is claimed and desired to be secured by Letters Patent of the U.S. is:

1. A coating composition for suppressing combustion of titanium metal comprising from about 14.8% by weight to about 73.7% by weight N,N-diglycidyl-2,4,6-tribromoaniline, from about 13.2% by weight to about 31.2% by weight a solution of cyclopentene ether-2,3,2',3' diepoxide in the diglycidyl ether of bisphenol A, a curing agent, and a solvent.

2. A coating composition according to claim 1 wherein said curing agent is selected from the group consisting of polyamines and polyamides.

3. A coating composition according to claim 1 wherein said diglycidyl ether of bisphenol A solution contains 37.5% by volume cyclopentene ether-2,3,2',3' diepoxide.

4. The composition of claim 1 wherein said solvent is ethanol.

5. The composition of claim 1 wherein said solvent comprises equimolar amounts of ethylacetate, cellusolve acetate, and 2-nitropropane.

* * * * *